US012801730B2

(12) United States Patent
Khanna

(10) Patent No.: US 12,801,730 B2
(45) **Date of Patent: *Nov. 17, 2026**

(54) SYSTEMS AND METHODS FOR TRAINING AN INSIDER ATTACK MODEL USING IMAGES HAVING BOTH REGION SPECIFICITY AND SPATIAL RELATIONSHIPS

(71) Applicant: Fortinet, Inc., Sunnyvale, CA (US)

(72) Inventor: Sameer Khanna, Sunnyvale, CA (US)

(73) Assignee: FORTINET, INC., Sunnyvale, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/970,416

(22) Filed: Dec. 5, 2024

(65) Prior Publication Data

US 2025/0103703 A1 Mar. 27, 2025

Related U.S. Application Data

(63) Continuation of application No. 17/888,665, filed on Aug. 16, 2022, now Pat. No. 12,223,038.

(Continued)

(51) Int. Cl.

| | |
|---|---|
| ***H04L 9/40*** | (2022.01) |
| ***G01V 1/01*** | (2024.01) |
| ***G01W 1/10*** | (2006.01) |
| ***G06F 18/24*** | (2023.01) |
| ***G06F 21/31*** | (2013.01) |
| ***G06F 21/55*** | (2013.01) |
| ***G06F 21/62*** | (2013.01) |

(Continued)

(52) U.S. Cl.

CPC .............. *G06F 21/552* (2013.01); *G01V 1/01* (2024.01); *G01W 1/10* (2013.01); *G06F 18/24* (2023.01); *G06F 21/316* (2013.01); *G06F 21/6218* (2013.01); *G06F 40/242* (2020.01); *G06F 40/279* (2020.01); *G06F 40/284* (2020.01); *G06N 7/01* (2023.01); *G06Q 20/389* (2013.01); *G06Q 40/02* (2013.01); *G06Q 40/08* (2013.01); *G06V 10/56* (2022.01); *G06V 10/764* (2022.01); *G06V 10/776* (2022.01); *G06V 40/20* (2022.01); *H04L 43/045* (2013.01); *H04L 63/1416* (2013.01); *H04L 63/1425* (2013.01); *G06F 40/157* (2020.01); *G06F 40/205* (2020.01); *G06F 40/295* (2020.01); *G06F 40/30* (2020.01); *G06Q 50/26* (2013.01)

(58) Field of Classification Search

CPC . H04L 63/1416; H04L 63/1425; G06V 10/70; G06V 10/77; G06V 10/764; G06V 10/776

USPC ...................................................... 726/22–25

See application file for complete search history.

(56) References Cited

U.S. PATENT DOCUMENTS

| | | | | |
|---|---|---|---|---|
| 11,651,313 | B1 | 5/2023 | Fridakis | |
| 11,704,409 | B2 * | 7/2023 | Miller | G06F 21/566 726/23 |

(Continued)

OTHER PUBLICATIONS

Khanna "Conical Classification for Computationally Efficient One-Class Topic Determination" Cornell Universtiy Oct. 31, 2021.

*Primary Examiner* — Bharat Barot

(74) *Attorney, Agent, or Firm* — Jaffery Watson Hamilton & DeSanctis LLP

(57) ABSTRACT

Systems, devices, and methods are disclosed that may be used for identifying potential insider attacks on a computer network.

20 Claims, 12 Drawing Sheets

Related U.S. Application Data

(60) Provisional application No. 63/235,887, filed on Aug. 23, 2021.

(51) Int. Cl.

| | |
|---|---|
| ***G06F 40/242*** | (2020.01) |
| ***G06F 40/279*** | (2020.01) |
| ***G06F 40/284*** | (2020.01) |
| ***G06N 7/01*** | (2023.01) |
| ***G06Q 20/38*** | (2012.01) |
| ***G06Q 40/02*** | (2023.01) |
| ***G06Q 40/08*** | (2012.01) |
| ***G06V 10/56*** | (2022.01) |
| ***G06V 10/764*** | (2022.01) |
| ***G06V 10/776*** | (2022.01) |
| ***G06V 40/20*** | (2022.01) |
| ***H04L 43/045*** | (2022.01) |
| *G06F 40/157* | (2020.01) |
| *G06F 40/205* | (2020.01) |
| *G06F 40/295* | (2020.01) |
| *G06F 40/30* | (2020.01) |
| *G06Q 50/26* | (2012.01) |

(56) References Cited

U.S. PATENT DOCUMENTS

| | | | | |
|---|---|---|---|---|
| 12,217,176 | B2 * | 2/2025 | Piegert | H04L 63/1441 |
| 12,223,038 | B2 * | 2/2025 | Khanna | H04L 63/1416 |
| 2017/0061123 | A1 | 3/2017 | Parker-Wood | |
| 2017/0070527 | A1 | 3/2017 | Bailey | |
| 2018/0191726 | A1 | 7/2018 | Luukkala | |
| 2020/0186544 | A1 | 6/2020 | Dichiu | |
| 2023/0039039 | A1 | 2/2023 | Keraudy | |

* cited by examiner

SYSTEMS AND METHODS FOR TRAINING AN INSIDER ATTACK MODEL USING IMAGES HAVING BOTH REGION SPECIFICITY AND SPATIAL RELATIONSHIPS

CROSS REFERENCE TO RELATED APPLICATIONS

This application is a continuation of U.S. patent application Ser. No. 17/888,665, filed Aug. 16, 2022, now U.S. Pat. No. 12,223,038, which claims priority to U.S. Provisional Application No. 63/235,887, filed Aug. 23, 2021. Both of the aforementioned patent applications are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to systems and methods for identifying potential insider attacks on a computer network.

BACKGROUND

Computer networks process large numbers of requests from those who are authorized to operate on the computer network and from those who are not authorized. Once challenge is discerning which of the requests are malicious and should not be processed. Because a relatively large number of requests derived from those not authorized by the network are malicious, it is relatively easy to train a computer model to identify such "outsider" attacks. In contrast, it has been estimated that less than 0.01 percent of requests derived from those authorized by the network, it is not a simple proposition to train a computer model to identify such "insider" attacks. Yet, such insider attacks can be just as devastating as outsider attacks.

Thus, there exists a need in the art for more advanced approaches, devices, and systems for identifying insider attacks.

SUMMARY

Various embodiments provides systems and methods for identifying potential insider attacks on a computer network.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
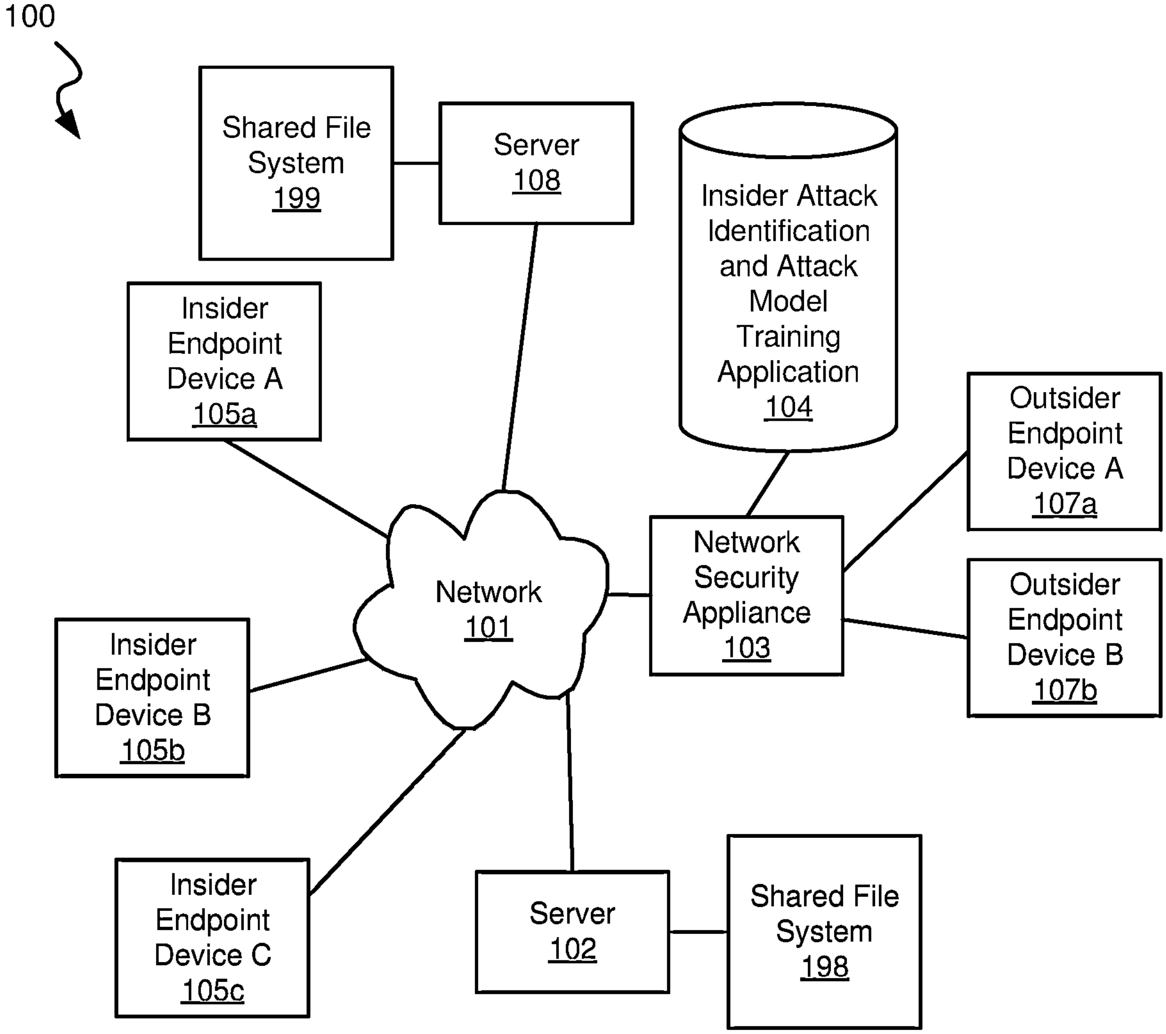
FIGS. 1A-1C illustrate a network architecture including an insider attack identification and attack model training application in accordance with some embodiments.

Various embodiments provide provides systems and methods for identifying potential insider attacks on a computer network.

Research suggests that insider attacks are a very small percentage of malicious behavior ongoing in relation to any given computer network. Because of the small percentage, it is very difficult to train a model to detect and/or classify such attacks as there is only a very small amount of data related to actual insider attacks when compared with the volume of other data. In such a small percentage situation, it is likely that training a model to identify detect and/or classify insider attacks will result in spurious indicators of insider attacks. Such a situation results in a number of nonsensical false positives, and perhaps many more false positives than false negatives.

Some embodiments provide methods for detecting insider attacks that generate color behavioral images representing activities of an insider over a period, and applying an insider attack classification model to the color behavioral image to discern whether an insider attack has occurred. Where an insider attack has occurred, the color behavioral image is characterized as an actual insider attack image. This actual insider attack image may be processed to generate one or more additional synthetic insider attack images. The combination of the actual insider attack image and the one or more synthetic attack images are used to train the insider attack classification model.

Some embodiments discussed herein provide approaches for multiplying the amount of insider attack data available to train an insider attack detection model by generating one or more synthetic sets of insider attack data sets for each actual insider attack data set available. By using this additional synthetic data as representing insider attacks, the accuracy of a trained insider attack detection model can be increased. Additionally, some embodiments use a Generative Adversarial Network (GAN) to process both synthetic insider attack images and actual insider attack images to produce additional synthetic insider attack images.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

TERMINOLOGY

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "insider attack" is used in its broadest sense to mean any attack against or launched from a communication network where the perpetrator of the attack is a trusted insider. As one example, a trusted insider may be someone who has been granted permission to access the communication network and has accessed the communication network using such permission. This is in contrast to an outsider who has not been granted permission to access the communication network, but may have obtained access through illicit means. In some cases, an insider attack is made by a trusted insider who has accessed the communication network from within a trusted perimeter. Such a trusted perimeter may be, but is not limited to, within a building supported by the communication network using, for example, a computer assigned to the trusted insider that is connected to the communication network physically within the building.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for detecting insider attacks. The methods include: logging, by a processing resource, activities of an insider performed in relation to a communication network to yield logged activities; extracting, by the processing resource, a set of defined behavioral features from the logged activities; forming, by the processing resource, a grayscale behavioral image corresponding to the set of defined behavioral features; combining, by the processing resource, the grayscale behavioral image with a first grayscale attack context image and a second grayscale attack context image to yield a color behavioral image; applying, by the processing resource, an insider attack classification model to the color behavioral image, wherein the color behavioral image indicates an actual insider attack; and storing, by the processing resource, the color behavioral image as an actual insider attack image.

In some instances of the aforementioned embodiments, the methods further include generating, by the processing resource, at least one synthetic insider attack image using the actual insider attack image. In some such instances, the methods further include: training, by the processing resource, the insider attack classification model using a combination of images including at least the actual insider attack image and the at least one synthetic insider attack image. In some instances of the aforementioned embodiments where the at least one synthetic insider attack image is a first insider attack image, the methods further include applying, by the processing resource, a generative adversarial network to the actual insider attack image to generate at least a second synthetic insider attack image. In some such instances, the methods further include training, by the processing resource, the insider attack classification model using a combination of images including at least the actual insider attack image, the first synthetic insider attack image, and the second insider attack image. In various instances of the aforementioned embodiments where the at least one synthetic insider attack image is a first insider attack image, the methods further include applying, by the processing resource, a generative adversarial network to the first synthetic insider attack image to generate at least a second synthetic insider attack image. In some such instances, the methods further include training, by the processing resource, the insider attack classification model using a combination of images including at least the actual insider attack image, the first synthetic insider attack image, and the second insider attack image.

In various instances of the aforementioned embodiments, the methods further include receiving, by the processing resource, a corroboration from an expert that the color behavioral image indicates the actual insider attack. In such instances, the storing the color behavioral image as an actual insider attack image is based upon a combination of the indication of the actual insider attack from the insider attack classification model and the corroboration from the expert. In some instances of the aforementioned embodiments combining the grayscale behavioral image with a first grayscale attack context image and a second grayscale attack context image to yield a color behavioral image includes: assigning the values of the grayscale behavioral image as one of a red component, a green component, or a blue component (e.g., a red component); assigning the values of the first grayscale attack context image as another of the red component, the green component, or the blue component (e.g., a green component); assigning the values of the second grayscale attack context image as a remaining one the red component, the green component, or the blue component (e.g., a blue component). In such instances, the color behavioral image includes a number of pixel positions each with red, green, and blue components corresponding to the same pixel position in each of the grayscale behavioral image, the first grayscale attack context image, and the second grayscale attack context image.

Other embodiments provide computer readable media that have stored therein instructions, which when executed by a processor, causes the processor to perform the following method: logging activities of an insider performed in relation to a communication network to yield logged activities; extracting a set of defined behavioral features from the logged activities; forming a grayscale behavioral image corresponding to the set of defined behavioral features; combining the grayscale behavioral image with a first grayscale attack context image and a second grayscale attack context image to yield a color behavioral image; applying an insider attack classification model to the color behavioral image, wherein the color behavioral image indicates an actual insider attack; and storing the color behavioral image as an actual insider attack image.

Yet other embodiments provide systems that include a processing resource and a computer readable medium. The computer readable medium has stored therein instructions, which when executed by the processing resource, causes the processing resource to: log activities of an insider performed in relation to a communication network to yield logged activities; extract a set of defined behavioral features from the logged activities; form a grayscale behavioral image corresponding to the set of defined behavioral features; combine the grayscale behavioral image with a first grayscale attack context image and a second grayscale attack context image to yield a color behavioral image; apply an insider attack classification model to the color behavioral image, wherein the color behavioral image indicates an actual insider attack; and store the color behavioral image as an actual insider attack image.

Various embodiments provide methods for increasing insider attack data. Such methods include: accessing an actual insider attack image; disaggregating the actual insider attack image into a first component image corresponding to an actual insider attack, a second component image corresponding to a first context of the actual insider attack, and a third component image corresponding to a first context of the actual insider attack; replacing the second component image with an alternate component image; and aggregating the first component image with at least the alternate component image to yield a synthetic insider attack image.

In some instances of the aforementioned embodiments, the alternate component image corresponds to a third context of the actual insider attack. In some such instances, the first context represents a different time period that the third context. In various of such instances, the third context is an average of context data over multiple time periods.

In various instances of the aforementioned embodiments where the alternate image is a first alternate image, the methods further include: replacing the third component image with a second alternate component image. In such instances, aggregating the first component image includes aggregating the first component image with the first alternate image and the second alternate image to yield the synthetic insider attack image. In some cases the first component image is a first color component of the actual insider attack image, the second component image is a second color component of the actual insider attack image, and the third component image is a third color component of the actual insider attack images. In one or more cases, the first color component is one of a red component, a green component, or a blue component; the second color component is another one of the red component, the green component, or the blue component; and the third color component is the remaining one of the red component, the green component, or the blue component.

In various of such instances, the first alternate component image is the third component image, and the second alternate component image is the second component image. In some cased, the first alternate component image corresponds to a third context of the actual insider attack, and the second alternate component image corresponds to a fourth context of the actual insider attack. In some cases, the first context represents a different time period than the third context, and wherein the second context represents a different time period than the fourth context. In more or more cases, the third context is an average of context data over multiple time periods.

Other embodiments provide computer readable media having stored therein instructions, which when executed by a processor, causes the processor to perform the following method: accessing an actual insider attack image; disaggregating the actual insider attack image into a first component image corresponding to an actual insider attack, a second component image corresponding to a first context of the actual insider attack, and a third component image corresponding to a first context of the actual insider attack; replacing the second component image with an alternate component image; and aggregating the first component image with at least the alternate component image to yield a synthetic insider attack image.

Yet other embodiments provide systems for augmenting insider attack data that include a processing resource and a computer readable medium. The computer readable medium has stored therein instructions, which when executed by the processing resource, causes the processing resource to: access an actual insider attack image; disaggregate the actual insider attack image into a first component image corresponding to an actual insider attack, a second component image corresponding to a first context of the actual insider attack, and a third component image corresponding to a first context of the actual insider attack; replace the second component image with an alternate component image; and aggregate the first component image with at least the alternate component image to yield a synthetic insider attack image.

Some embodiments provide methods for modeling insider attacks. Such methods include: generating an image for each of multiple attack vectors to generate multiple real images, where each of the multiple attack vectors include data elements from network traffic in an insider attack; creating multiple noise modified vectors by modifying at least one element of each of the multiple attack vectors; by the processing resource, an image for each of multiple noise modified vectors to yield multiple generated images; classifying each of the real images and generated images as corresponding to either an attack vector or a noise modified vector; calculating an accuracy of the classifying; and identifying an insider attack model as trained based at least in part on the accuracy of the classifying being less than or equal to a threshold value.

In some instances of the aforementioned embodiments, the threshold value is between forty-five (45) percent accurate and fifty-five (55) percent accurate. In various instances of the aforementioned embodiments, the threshold value is between than forty-nine (49) percent accurate and fifty-one (51) percent accurate.

In various instances of the aforementioned embodiments, generating an image of an attack vector includes: applying a leaky rectified linear unit fully connected layer stage to the attack vector to yield a first output; and applying a leaky rectified linear unit two dimension convolution stage to a second output derived from the first output to yield a third output. In some such instances where the leaky rectified linear unit fully connected layer stage is a first leaky rectified linear unit fully connected layer stage and the leaky rectified linear unit two dimension convolution stage is a first leaky rectified linear unit two dimension convolution stage, generating the image of the attack vector further includes: applying a second leaky rectified linear unit fully connected layer stage to a fourth output derived from the first output to yield a fifth output, wherein the second output is derived from the fifth output; applying a second leaky rectified linear unit two dimension convolution stage to a sixth output derived from the third output to yield a seventh output; and applying a third leaky rectified linear unit two dimension convolution stage to an eighth output derived from the seventh output.

In some instances of the aforementioned embodiments, generating an image of a noise modified vector includes: applying the leaky rectified linear unit fully connected layer stage to the attack vector to yield a fourth output; and applying the leaky rectified linear unit two dimension convolution stage to a fifth output derived from the fourth output to yield a sixth output.

In various instances of the aforementioned embodiments, classifying an image includes: flattening a received image to yield a flattened image; applying a leaky rectified linear unit fully connected layer stage to the flattened image to yield a first output; and applying a leaky rectified linear unit two dimension convolution stage to a second output derived from the first output to yield a third output. In some such instances where the leaky rectified linear unit fully connected layer stage is a first leaky rectified linear unit fully connected layer stage and the leaky rectified linear unit two dimension convolution stage is a first leaky rectified linear unit two dimension convolution stage, generating the image of the attack vector further includes: applying a second leaky rectified linear unit two dimension convolution stage to the third output to yield a fifth output; applying a third leaky rectified linear unit two dimension convolution stage to the fifth output to yield a sixth output; and applying a second leaky rectified linear unit fully connected layer stage to a seventh output derived from the sixth output.

Other embodiments provide systems for training an insider attack classification model. Such systems include a processing resource and a non-transitory computer-readable medium. The non-transitory computer-readable medium has stored therein instructions that when executed by the processing resource cause the processing resource to perform the method including: generating an image for each of multiple attack vectors to generate multiple real images, where each of the multiple attack vectors include data elements from network traffic in an insider attack; creating multiple noise modified vectors by modifying at least one element of each of the multiple attack vectors; generating an image for each of multiple noise modified vectors to yield multiple generated images; classifying each of the real images and generated images as corresponding to either an attack vector or a noise modified vector; calculating an accuracy of the classifying; and identifying an insider attack model as trained based at least in part on the accuracy of the classifying being less than or equal to a threshold value.

Yet other embodiments provide non-transitory computer-readable storage media embodying a set of instructions, which when executed by a processing resource, causes the processing resource to perform a method including: generating an image for each of multiple attack vectors to generate multiple real images, where each of the multiple attack vectors include data elements from network traffic in an insider attack; creating multiple noise modified vectors by modifying at least one element of each of the multiple attack vectors; generating an image for each of multiple noise modified vectors to yield multiple generated images; classifying each of the real images and generated images as corresponding to either an attack vector or a noise modified vector; calculating an accuracy of the classifying; and identifying an insider attack model as trained based at least in part on the accuracy of the classifying being less than or equal to a threshold value.

Turning to FIG. 1A, network architecture 100 is shown in accordance with some embodiments. In the context of network architecture 100, a network security appliance 103 controls access to network elements within a local network 101 derived from outsider endpoint devices 107 (e.g., outsider endpoint device A 107*a* and outsider endpoint device B 107*b*). Further, network security appliance 103 monitors network traffic derived from insider endpoint devices 105 (e.g., insider endpoint device A 105*a*, insider endpoint device B 105*b*, and insider endpoint device C 105*c*). An insider endpoint device 105 is an endpoint device that is known to and has been authorized to access local network 101. In contrast, an outsider endpoint device 105 has not been authorized to access elements in local network 101.

Insider endpoint devices 105 may be used, for example, to access a shared file system 198 supported by a server 102 or to access a shared file system 199 supported by a server 108. Based upon the disclosure provided herein, one of ordinary skill in the art will recognize a variety of network services and/or devices that may be accessed by insider endpoint devices 105, but not accessed by outsider endpoint devices 107.

Local network 101 may be any type of communication network known in the art. Those skilled in the art will appreciate that, local network 101 can be a wireless network, a wired network, or a combination thereof that can be implemented as one of the various types of networks, such as an Intranet, a Local Area Network (LAN), a Wide Area Network (WAN), an Internet, and the like. Further, network 101 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Network security appliance 103 is communicably coupled to a computer readable medium that includes an insider attack identification and attack model training application 104. The application includes instructions executable by network security appliance 103 to generate synthetic insider attack data sets based upon actual insider attack data sets. These synthetic insider attack data sets are used in addition to the actual insider attack data sets to train an insider attack detection model. This insider attack detection model may be deployed in relation to network security appliance 103 to monitor insider attacks on network 101.

Figure 1B:
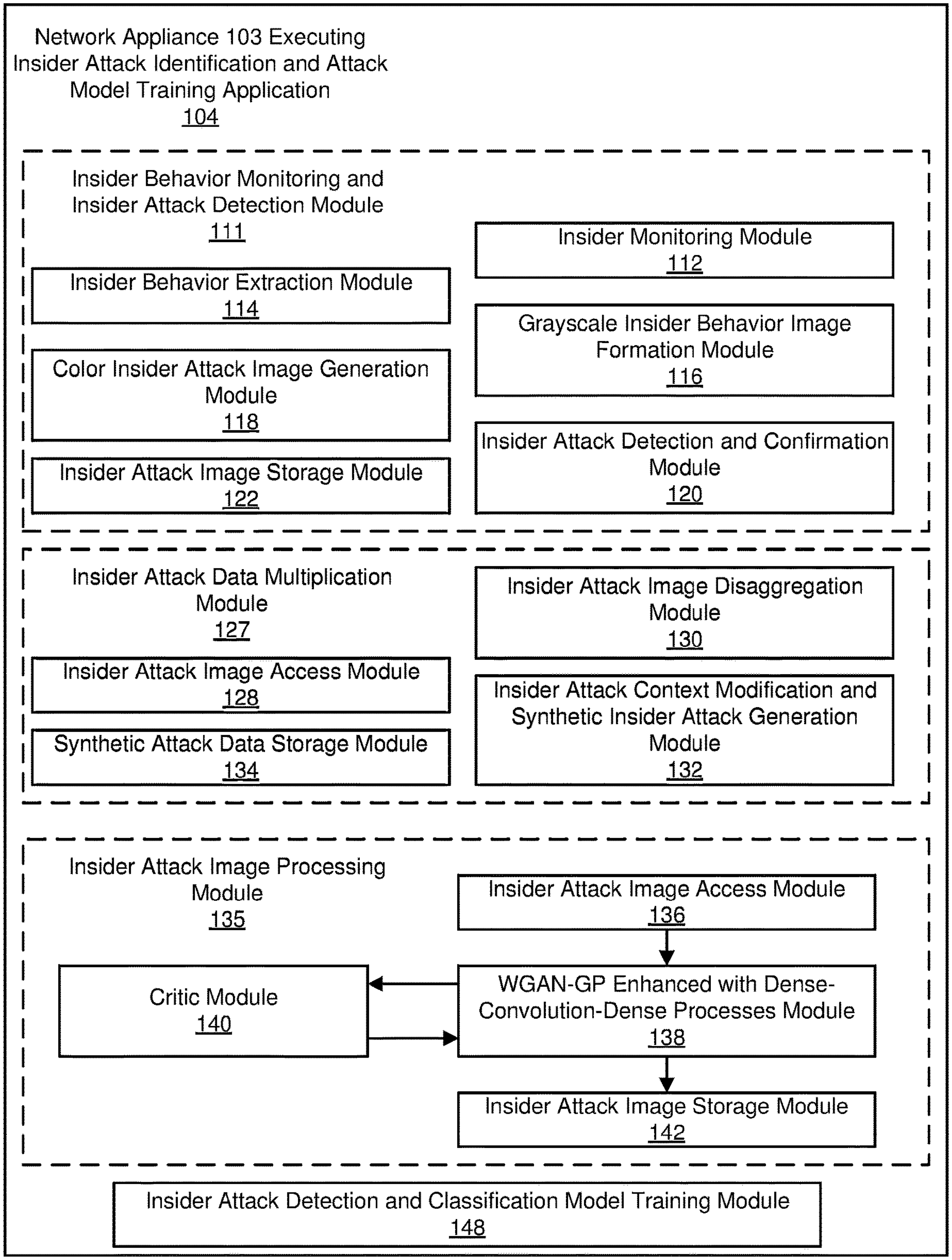

Turning to FIG. 1B, an example implementation of network security appliance 103 executing insider attack identification and attack model training application 104 is shown in accordance with some embodiments. Among other things, network security appliance 103 includes: an insider behavior monitoring and insider attack detection model 111, an insider attack data multiplication module 127, an insider attack image processing module 135, and an insider attack detection and classification model training module 148.

Insider behavior monitoring and insider attack detection model 111 includes: an insider monitoring module 112, an insider behavior extraction module 114, a grayscale insider behavior image formation module 116, a color insider attack generation module 118, an insider attack detection and confirmation module 120, and an insider attack image storage module 122.

Insider monitoring module 112 is configured to detect interaction of an insider with a communication network and to log the insider's activities. Such activities may include, but are not limited to, file systems accessed, files accessed, computers used, applications used, time the activities occur, use of external storage media such as thumb drives, or the like. Based upon the disclosure provided herein, one of ordinary skill in the art will recognize a large variety of activities that may be logged in relation to the trusted insider in relation to different embodiments.

Insider behavior extraction module 114 is configured to periodically extract behavioral features of the insider from the logged insider activity. The features that are extracted are user programmable and are typically chosen as those expected to be seen when problematic behavior is ongoing. Such features may include, but are not limited to, time of day, files accessed, file systems accessed, files accessed, computers used, applications used, use of external storage media such as thumb drives, or the like.

Grayscale insider behavior image formation module 116 is configured to form the extracted behavioral features into a grayscale behavioral image. This may be done, for example, by taking a behavior vector including each of the respective features in a defined location in the behavior vector and form it into a two dimensional image (e.g., a 32×32 image where the vector includes 1024 or fewer features).

Color insider attack generation module 118 is configured to access a first grayscale attack context image and a second grayscale attack context image, and to combine the grayscale behavioral image is combined with the first grayscale attack context image and the second grayscale attack context image to yield a color behavioral image. The first grayscale attack context image and the second grayscale attack context image are images generated from data of prior time periods for the same trusted individual where it was determined that no illicit behavior had occurred. As an example, in some embodiments, the first grayscale attack context image and a second grayscale attack context image are the preceding days' image and the image from two days prior, respectively, for the same insider being monitored. As another example, the first grayscale attack context image and a second grayscale attack context image are the preceding days' data and an average of the data for the preceding month, respectively, for the same insider being monitored. Based upon the disclosure provided herein, one of ordinary skill in the art will recognize a variety of context images that may be used in relation to different embodiments. Combining the aforementioned grayscale images to yield the color behavioral image may include assigning a respective component color (e.g., red, green, or blue) to each of the grayscale behavioral image, the first grayscale attack context image, and the second grayscale attack context image. As a particular example, the values of the grayscale behavioral image are assigned as red values, the values of the first grayscale attack context image are assigned as green values, and the second grayscale attack context image are assigned as blue values. When combined, each location of the resulting image has a complemented of red, green, and blue values which render the color image.

Insider attack detection and confirmation module 120 is configured to apply an insider attack classification model to the color behavioral image. This application results in an indication of whether the color behavioral image indicates an insider attack. This model is trained using actual insider attack images and synthetic insider attack images as discussed below, and the more images available for training generally result in an increased accuracy of the model.

Insider attack image storage module 122 is configured to store a color behavioral image that is classifies as indicating an insider attack as an actual insider attack image. In some cases, the classification is based only on the output of the insider attack classification model. In other cases, the classification is based upon both the output of the insider attack classification model and an input from an expert reviewing the data corresponding to the color behavioral image.

Insider attack data multiplication module 127 is configured to generate a number of synthetic insider attack images for each actual insider attack image that is available. Insider attack data multiplication module 127 includes an insider attack image access module 128, an insider attack image disaggregation module 130, an insider attack context modification module and synthetic insider attack generation module 132, and a synthetic attack image storage module 134.

Insider attack image access module 128 is configured to select and access insider attack images from a storage medium, and select and access alternate context images where used. Insider attack image disaggregation module 130 is configured to disaggregate selected insider attack images into component parts. The component parts include a first component part corresponding to an actual insider attack, and a second and third component parts corresponding to context for the actual insider attack.

Insider attack context modification module and synthetic insider attack generation module 132 is configured to replace one or both of the second and third component parts with alternate contexts. The alternate contexts pertain to the same individual associated with the selected insider attack image. In some cases, the alternate context(s) is/are replacement contexts not previously associated with the insider attack image. In other cases, the alternate contexts are simply the second and third component parts, and the replacement includes swapping the second component part with the third component part. In addition, insider attack context modification module and synthetic insider attack generation module 132 is configured to create a synthetic insider attack image by combining the first component part, the second component part, and the third component part after component part replacement. Insider attack image storage module 134 is configured to store the generated synthetic insider attack image with other insider attack images including, but not limited to, the actual insider attack image from which the synthetic insider attack image was generated.

Insider attack image processing module 135 is configured to process insider attack images (both actual insider attack images and synthetic insider attack images) to reduce effects of generating multiple synthetic insider attack images based upon fewer actual insider attack images such as, for example, overfitting. Insider attack image processing module 135 includes an insider attack image access module 136, a Wasserstein GAN with gradient penalty (WGAN-GP) enhanced with dense-convolution-dense processes module 138, a critic module 140, and an insider attack image storage module 142.

Insider attack image access module 136 is configured to access insider attack images from a storage medium, and reduce the insider attack images to vectors representative of a corresponding insider attack (whether synthetic or actual). These vectors are provided to WGAN-GP enhanced with dense-convolution-dense processes module 138.

WGAN-GP enhanced with dense-convolution-dense processes module 138 is configured to generate images based upon the vectors received from insider attack image access module 136. In addition, WGAN-GP enhanced with dense-convolution-dense processes module 138 introduces noise to the received insider attack vectors by making small modifications to different vector values and generates images for each of these noise modified vectors. Such an approach results in a significant multiplication of images for the actual insider attack vectors and for surrounding noise modified vectors. Such an approach yields potentially thousands of slightly different images for each of the actual insider attack vectors.

Critic module 140 is configured to accept a generated image from WGAN-GP enhanced with dense-convolution-dense processes module 138 and classify the received image as a real image or a generated image. In effect, critic module 140 seeks to determine whether an image received from WGAN-GP enhanced with dense-convolution-dense processes module 138 was created using a vector from an actual insider attack or a noise modified vector. Where the noise modification was to vector elements that are not indicative of an insider attack, critic module 140 is able to classify the received image as not corresponding to an insider attack or a generated image. In contrast, where the noise modification was to vector elements that are indicative of an insider attack, critic module 140 is less able to correctly classify the received image as a generated image. This classification information is fed back to WGAN-GP enhanced with dense-convolution-dense processes module 138.

In operation, WGAN-GP enhanced with dense-convolution-dense processes module 138 begins by adding noise to random elements in a known insider attack vectors to generate a large number of images. These images are provided to critic module 140 that operates to classify the received images as either real images (i.e., generated from an actual insider attack) or generated images (i.e., generated from a noise modified vector). This classification information is fed back to WGAN-GP enhanced with dense-convolution-dense processes module 138. Where a noise modified vector is incorrectly classified by critic module 140 as a real image, WGAN-GP enhanced with dense-convolution-dense processes module 138 learns that modification around the vector element modified in the particular noise modified vector confuses critic module 140. In contrast, where a noise modified vector is correctly classified by critic module 140 as a generated image, WGAN-GP enhanced with dense-convolution-dense processes module 138 learns that modification around the vector element modified in the particular noise modified vector does not confuse critic module 140. Insider attack image storage module 142 is configured to store images of all vectors (whether real or generated) that are identified by critic module 140 as indicative of an insider attack.

Insider attack detection and classification model training module 148 is configured to access a combination of actual insider attack images and synthetic insider attack images to train and update training of the insider attack detection and classification model used to detect insider attacks in a communication network. Such training may be done in accordance with any known machine learning approach known. As more insider attack images become available, the training of the insider attack detection and classification model results in more accurate understanding of what an insider attack looks like, and thus provides more accuracy in detecting and classifying insider attacks.

Figure 1C:
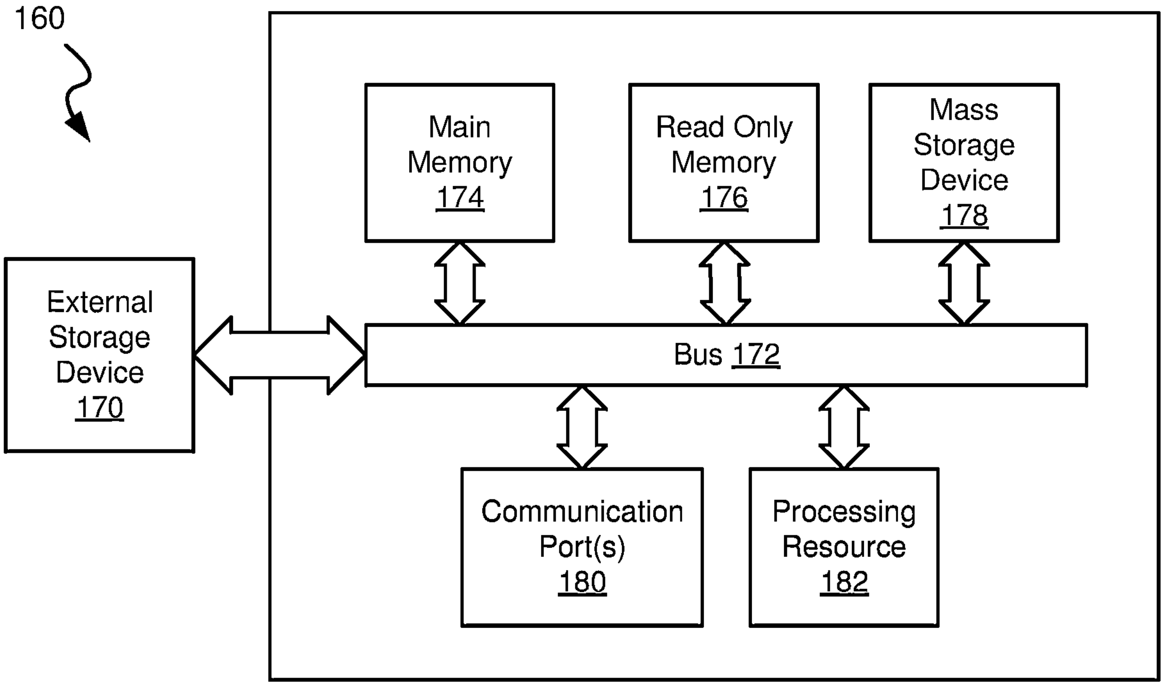

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of any of network security appliance 103, insider endpoint device 105, and/or outsider endpoint device 107.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2A:
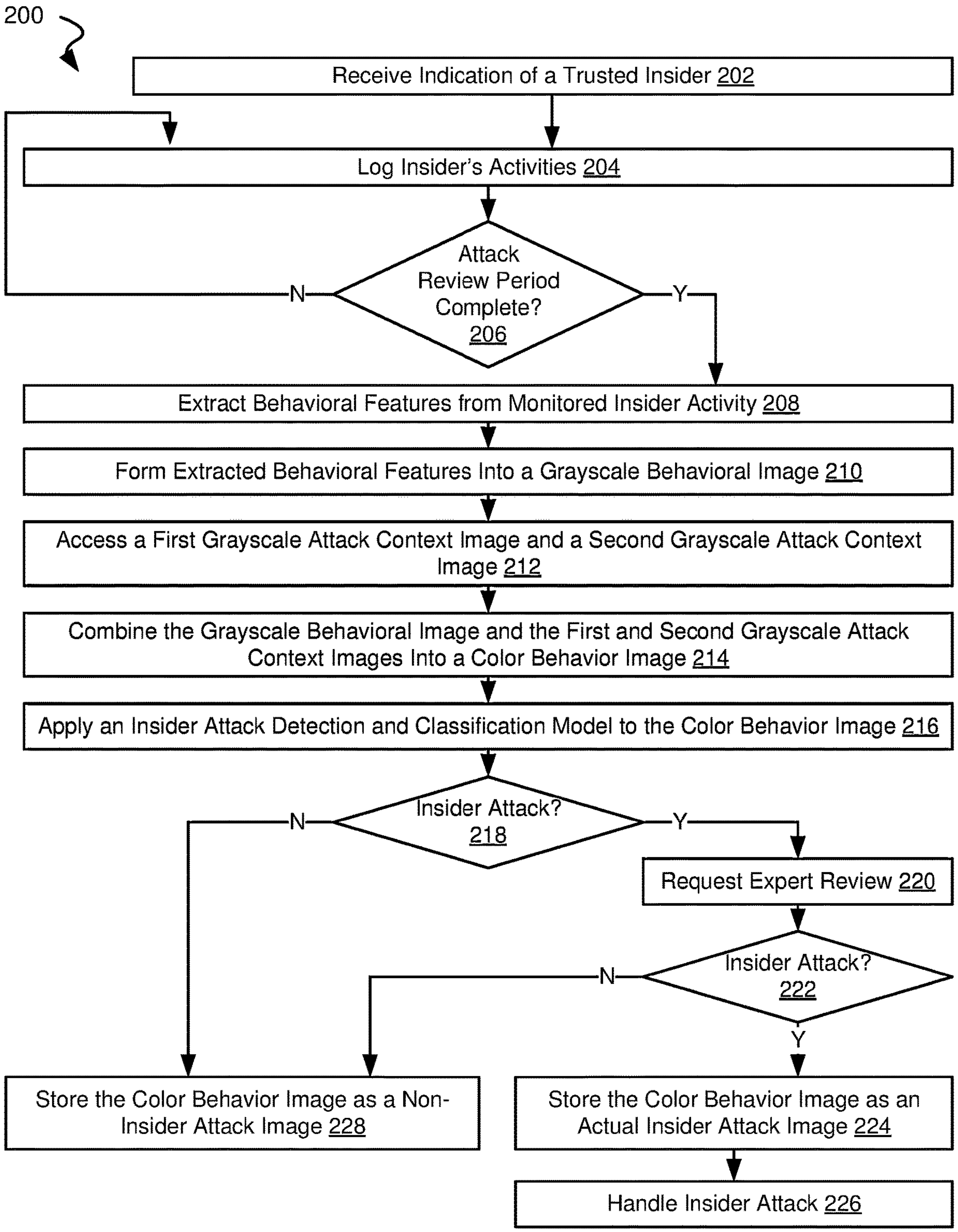
FIGS. 2A-2B are flow diagrams showing a method in accordance with some embodiments for detecting insider attacks and training an insider attack detection and classification model.

Turning to FIG. 2A, a flow diagram 200 shows a method in accordance with some embodiments for detecting insider attacks and training an insider attack detection and classification model. Following flow diagram 200, an indication of a network access granted to an insider is received (block 202). This may include any indication that a trusted insider is using the communication network. As an example, an indication may be received that the trusted insider entered the building supported by the communication network. As another example, an indication may be received that a computer assigned to the trusted insider and connected to the communication network is being used. As yet another example, an indication may be received that the trusted insider has been authenticated to the communication network. Based upon the disclosure provided herein, one of ordinary skill in the art will recognize a variety of indications that may be received that indicate a start of activities by a trusted insider.

All of the trusted insider's activities are logged (block 204). Such activities may include, but are not limited to, file systems accessed, files accessed, computers used, applications used, time the activities occur, use of external storage media such as thumb drives, or the like. Based upon the disclosure provided herein, one of ordinary skill in the art will recognize a large variety of activities that may be logged in relation to the trusted insider in relation to different embodiments. It is determined whether an attack review period has completed (block 206). Such an attack review period may be any period of time over which an insider's activities are logged. For example, in some embodiments, the attack review period is a twenty-four (24) hour period that begins at midnight one day and ends at midnight the following day. Based upon the disclosure provided herein, one of ordinary skill in the art will recognize a variety of attack review periods that may be used in relation to different embodiments.

Where the attack review period has completed (block 206), behavioral features are extracted from the monitored insider activity (block 208). The features that are extracted are user programmable and are typically chosen as those expected to be seen when problematic behavior is ongoing. Such features may include, but are not limited to, time of day, files accessed, file systems accessed, files accessed, computers used, applications used, use of external storage media such as thumb drives, or the like. Based upon the disclosure provided herein, one of ordinary skill in the art will recognize a large variety of features that may be extracted from monitored insider activity in accordance with different embodiments.

The extracted behavioral features are formed into a grayscale behavioral image (block 210). This may be done, for example, by taking a behavior vector including each of the respective features in a defined location in the behavior vector and form it into a two dimensional image (e.g., a 32×32 image where the vector includes 1024 or fewer features).

A first grayscale attack context image and a second grayscale attack context image are accessed from a storage medium (block 212). The first grayscale attack context image and the second grayscale attack context image are images generated from data of prior time periods for the same trusted individual where it was determined that no illicit behavior had occurred. As an example, in some embodiments, the first grayscale attack context image and a second grayscale attack context image are the preceding days' image and the image from two days prior, respectively, for the same insider being monitored. As another example, the first grayscale attack context image and a second grayscale attack context image are the preceding days' data and an average of the data for the preceding month, respectively, for the same insider being monitored. Based upon the disclosure provided herein, one of ordinary skill in the art will recognize a variety of context images that may be used in relation to different embodiments.

The grayscale behavioral image is combined with the first grayscale attack context image and a second grayscale attack context image to yield a color behavioral image (block 214). This may be done, for example, by assigning a respective component color (e.g., red, green, or blue) to each of the grayscale behavioral image, the first grayscale attack context image, and the second grayscale attack context image. As a particular example, the values of the grayscale behavioral image are assigned as red values, the values of the first grayscale attack context image are assigned as green values, and the second grayscale attack context image are assigned as blue values. When combined, each location of the resulting image has a complemented of red, green, and blue values which render the color image.

An insider attack detection and classification model is applied to the color behavioral image (block 216). This application results in an indication of whether the color behavioral image indicates an insider attack. This model is trained using actual insider attack images and synthetic insider attack images as discussed below, and the more images available for training generally result in an increased accuracy of the model.

Where an insider attack is indicated based upon the color behavioral image (block 218), an expert is alerted to review the data available on the detected insider attack (block 220). Where the expert reviews the data and indicates that it was in fact an insider attack (block 222), the color behavioral image is stored to a storage medium as an actual insider attack image (block 224) and the insider attack is handled by human resources (block 226). Alternatively, where either the model indicated that the color behavioral image was not an insider attack (block 220) or the expert indicated that it was not an inside attack (block 222), the color behavioral image is stored as a non-insider attack image (block 228). This non-insider attack image may be used, for example, to generate grayscale attack context images.

Figure 2B:
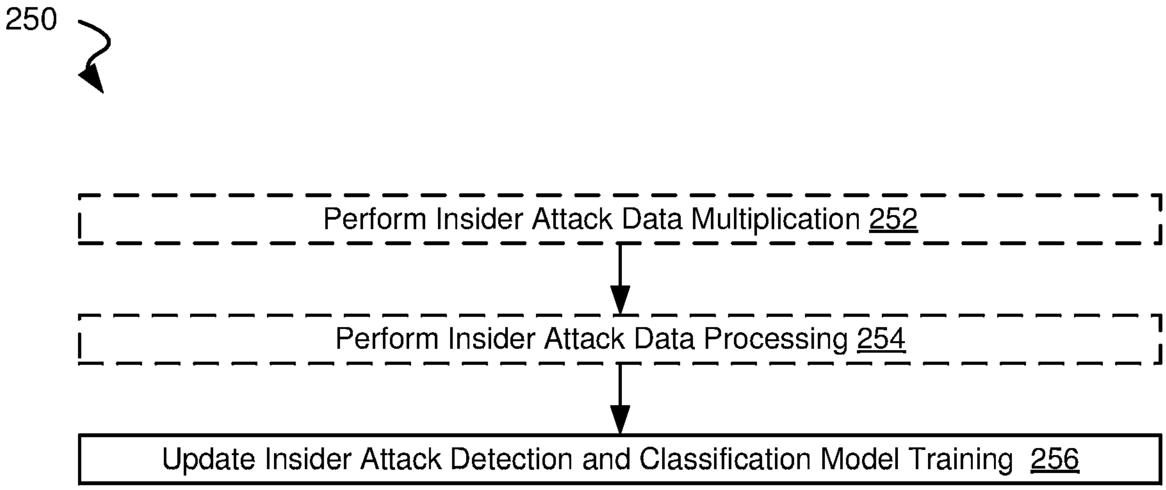

Turning to FIG. 2B, a flow diagram 250 continues the method of FIG. 2A. Following flow diagram 250, the actual insider attack data maintained in the storage medium is used to perform insider attack multiplication (block 252). Such insider attack multiplication results in one or more synthetic insider attack images being generated for each actual insider attack image in the storage medium. In some embodiments, as discussed in relation to FIG. 3 below, one synthetic insider attack image is generated for each available actual insider attack image. In various embodiments, as discussed below in relation to FIG. 5, any number of synthetic insider attack images is generated for each actual insider attack image in the storage medium limited only by the number of replacement context images available and the possibility of significant overfitting. The generated synthetic insider attack images are stored with the actual insider attack images.

Both the actual insider attack images and synthetic insider attack images are processed to reduce any artefacts of data multiplication (block 254). This processing may be done similar to that discussed below in relation to FIGS. 7-9.

Using the processed insider attack images, an insider attack detection and classification model is trained (block 256). Such training may be done in accordance with any known machine learning approach known. As more insider attack images become available, the training of the insider attack detection and classification model results in more accurate understanding of what an insider attack looks like, and thus provides more accuracy in detecting and classifying insider attacks.

Figure 3:
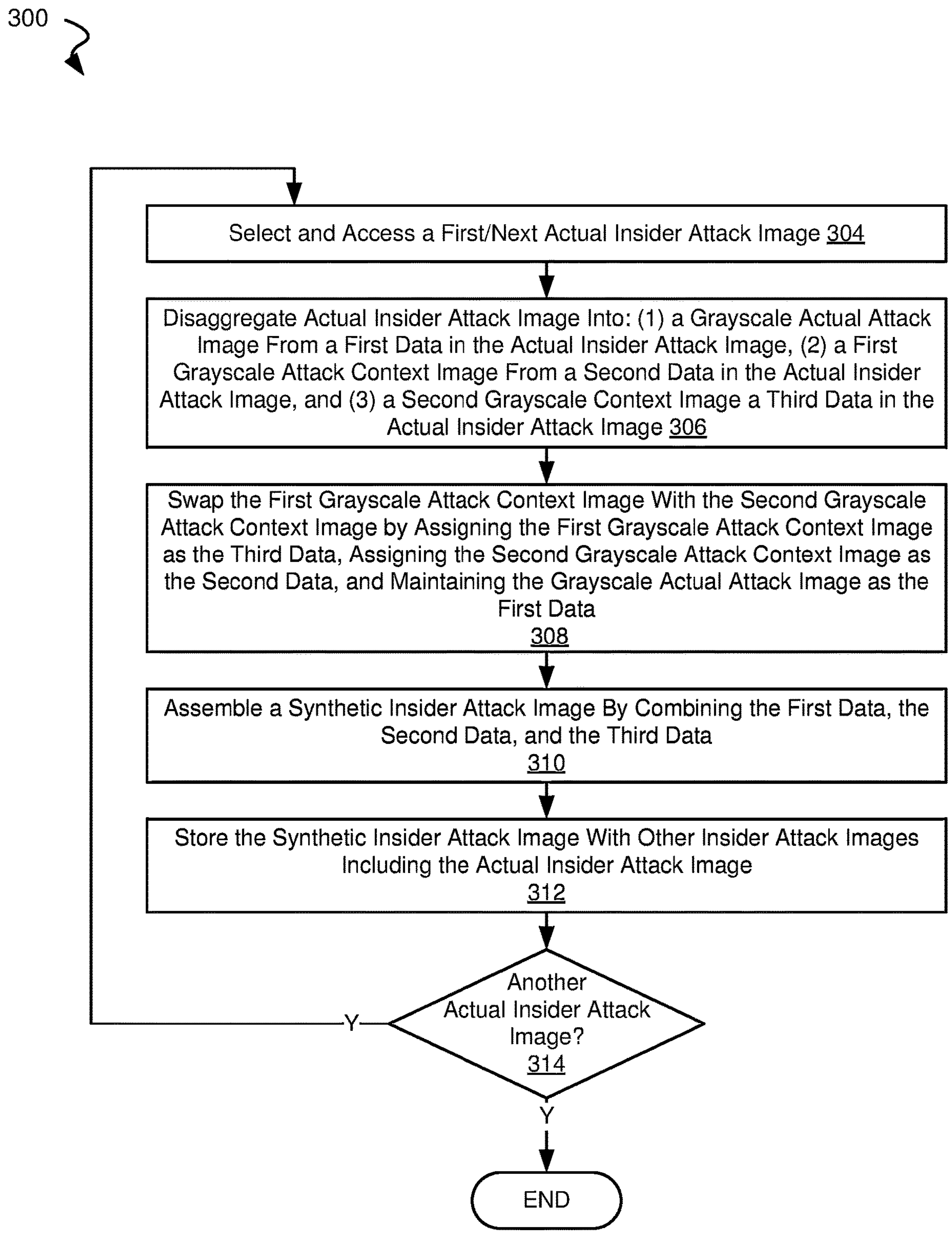
FIG. 3 is a flow diagram showing a method in accordance with some embodiments for generating one additional set of insider attack data for every actual set of insider attack data available.

Turning to FIG. 3, a flow diagram 300 shows a method in accordance with some embodiments for generating one additional set of insider attack data (i.e., a synthetic insider attack image) for every actual set of insider attack data available. One of a number of actual insider attack images is selected and accessed from a storage medium (block 304).

The attack images may include the actual attack data as one channel of the images, and include context data as other channels of the data. In one embodiment, the channel of the actual insider attack data is red, and two context channels are respectively green and blue. By combining the three channels, a three color image (red, green, blue) is created as an actual insider attack image. The context channels include data for the same individual represented by the actual insider attack data for one or more periods of time where no insider attack occurred. As such, the context channels are in contrast to the channel with the actual insider attack data as, unlike the actual insider attack channel, they do not show an insider attack. As an example, in some embodiments, the two context data images are the preceding days' data and the data from two days prior, respectively, for the same individual reflected in the actual insider attack data. As another example, the two context data images are the preceding days' data and an average of the data for the preceding month, respectively, for the same individual reflected in the actual insider attack data.

The actual insider attack images have been previously classified as an insider attack. In some cases, the classification is an automatic classification using an insider attack classification model. In other cases, the classification is a manual classification made by a system administrator. In yet other cases, the classification is at first an automatic classification followed by a manual classification. The actual insider attack images are stored to a computer readable medium.

The selected actual insider attack image is disaggregated into component channels (block 306). In particular, the actual insider attack image is disaggregated into: (1) a grayscale actual attack image from a first data in the actual insider attack image, (2) a first grayscale attack context image from a second data in the actual insider attack image, and (3) a second grayscale attack context image from a third data in the actual insider attack image. The first data, second data, and third data of the actual insider attack image are the respective channels discussed above. Thus, using the example above where the three channels are read, green, and blue, respectively, the actual grayscale actual attack image may be formed from the red components of the actual insider attack image; the first grayscale attack context image may be formed from the green components of the actual insider attack image; and the second grayscale attack context image may be formed from the blue components of the actual insider attack image.

Figure 4:
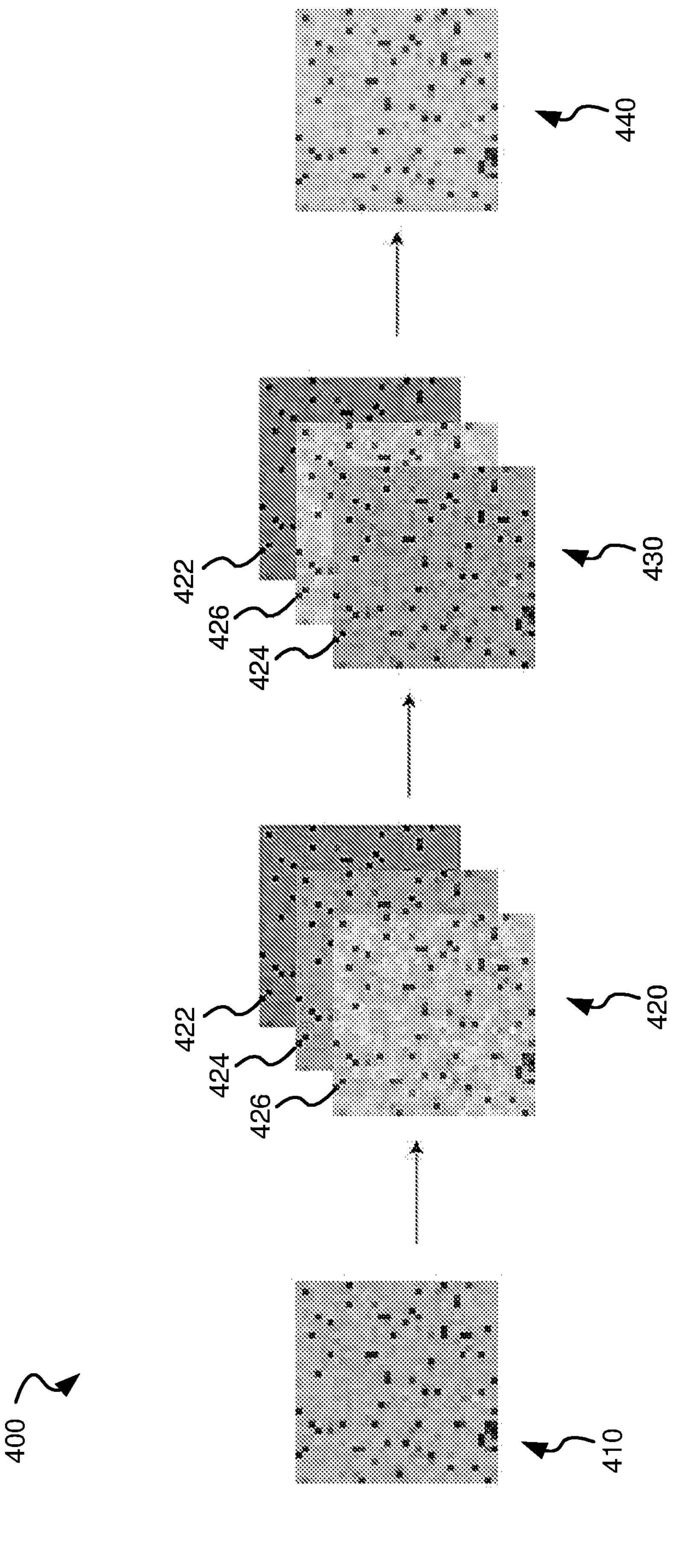
FIG. 4 graphically depicts the process of the flow diagram of FIG. 3.

Turning to FIG. 4, a process 400 is shown where a color actual insider attack image 410 is disaggregated into a three channel set 420 with: (1) a grayscale actual attack image 422 corresponding to one component color (e.g., red) of actual insider attack image 410, (2) a first grayscale attack context image 424 corresponding to another component color (e.g., green) of actual insider attack image 410; and (3) a second grayscale attack context image 426 corresponding to yet another component color (e.g., blue) of actual insider attack image 410.

Returning to FIG. 3, the first grayscale attack context image is swapped with the second grayscale attack context image by assigning the first grayscale attack context image as the third data, and assigning the second grayscale attack context image as the second data (block 308). The first data corresponding to actual attack image remains unchanged.

Turning to FIG. 4, process 400 shows the swapping of first grayscale attack context image 424 with second grayscale attack context image 426 in a three channel set 430. In the case where grayscale actual attack image 422 corresponds to the red components of actual insider attack image 410, first grayscale attack context image 424 correspond to the green components of actual insider attack image 410, and second grayscale attack context image 426 correspond to the blue components of actual insider attack image 410, the value of the blue components become the value of green components, and the value of the green components become the value of blue components.

Returning to FIG. 3, the swapped first grayscale attack context image and second grayscale attack context image are re-combined with the grayscale actual attack image to yield a synthetic insider attack image (block 310). The color of the synthetic insider attack image will be different (unless the two swapped attack context images were identical) from the actual insider attack image. This is because two color components (e.g., red and green) will be swapped from the original. This synthetic insider attack image is stored with other insider attack images (both actual and synthetic) (block 312). These combined insider attack images can be used to train an insider attack detection model.

Turning to FIG. 4, process 400 shows the combining of swapped grayscale attack context images 424, 426 with grayscale actual attack image 422 to yield a synthetic insider attack image 440. Again, as described in relation to FIG. 3, the color of synthetic insider attack image 440 will be different from the color of actual insider attack image 410 unless first grayscale attack context image 424 is identical to second grayscale attack context image 426.

Returning to FIG. 3, it is determined whether another actual insider attack image remains to be processed (block 314). Where another remains to be processed (block 314), the processes of blocks 304-212 are repeated for the next selected actual insider attack image.

Figure 5:
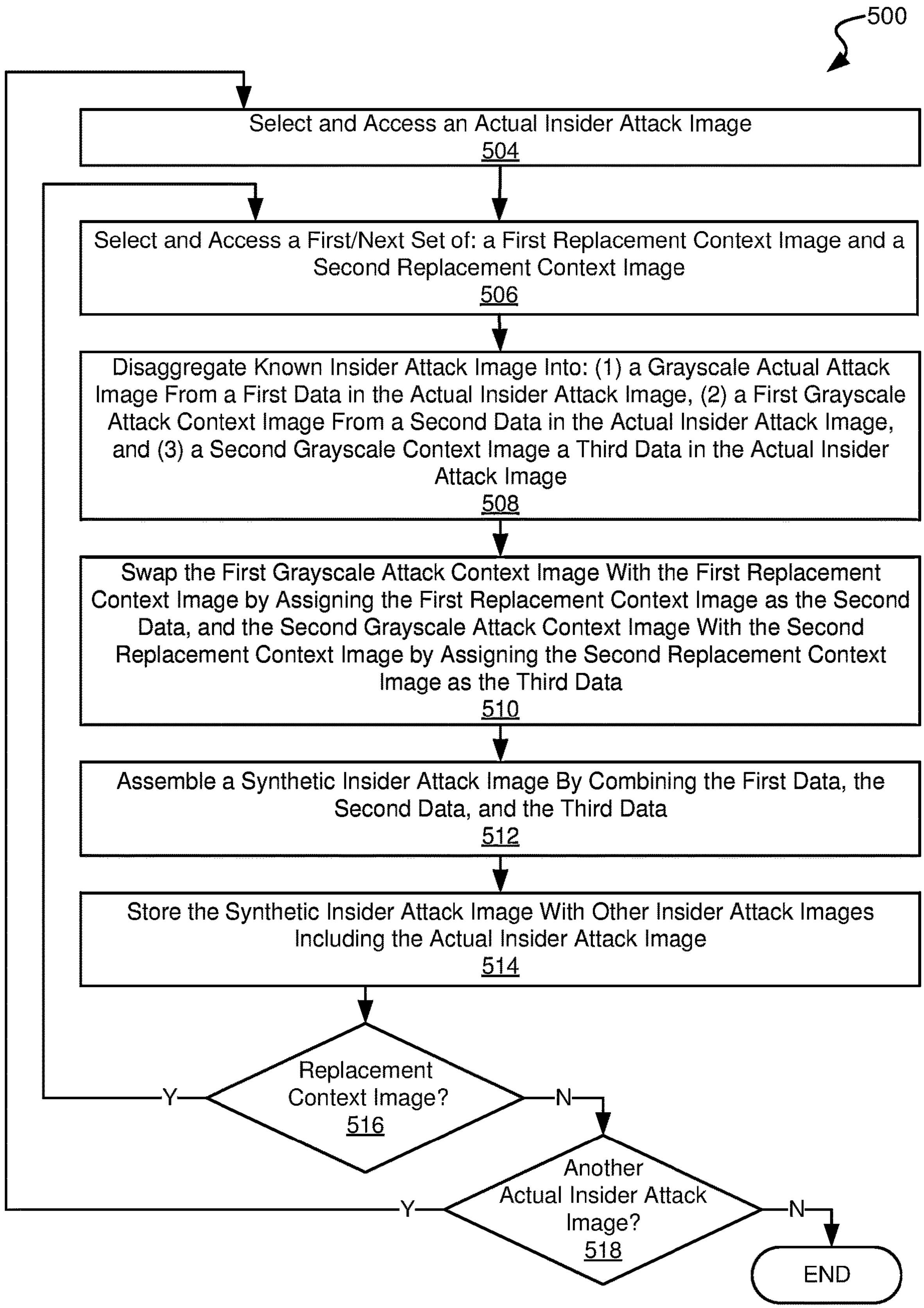
FIG. 5 is a flow diagram showing a method in accordance with some embodiments for generating multiple additional sets of insider attack data for every actual set of insider attack data available.

Turning to FIG. 5, a flow diagram 500 shows a method in accordance with some embodiments for generating multiple additional sets of insider attack data for every actual set of insider attack data available. Following flow diagram 500, one of a number of actual insider attack images is selected and accessed from the storage medium (block 504). The attack images may include the actual attack data as one channel of the images, and include context data as other channels of the data. In one embodiment, the channel of the actual insider attack data is red, and two context channels are respectively green and blue. By combining the three channels, a three color image (red, green, blue) is created as an actual insider attack image. The context channels include data for the same individual represented by the actual insider attack data for one or more periods of time where no insider attack occurred. As such, the context channels are in contrast to the channel with the actual insider attack data as, unlike the actual insider attack channel, they do not show an insider attack. As an example, in some embodiments, the two context data images are the preceding days' data and the data from two days prior, respectively, for the same individual reflected in the actual insider attack data. As another example, the two context data images are the preceding days' data and an average of the data for the preceding month, respectively, for the same individual reflected in the actual insider attack data.

The actual insider attack images have been previously classified as an insider attack. In some cases, the classification is an automatic classification using an insider attack classification model. In other cases, the classification is a manual classification made by a system administrator. In yet other cases, the classification is at first an automatic classification followed by a manual classification. The actual insider attack images are stored to a computer readable medium.

In addition, replacement context images are accessed (block 506). The replacement context images include a first replacement context image and a second replacement context image. The replacement context images are context images that are related to the same individual to which the actual insider attack image is related, but are for different time periods than the context included in the actual insider attack image. As an example, the context data included with the actual insider attack image may be the preceding days' data and the data from two days prior, respectively. In contrast, the replacement context images may be an average of the prior week and an average for the prior month for the individual to which the actual insider attack image is related. Similar to the context data included with the actual insider attack image, the replacement context images do not correspond to an insider attack, but are not the same as the context data included with the actual insider attack image.

The selected actual insider attack image is disaggregated into component channels (block 508). In particular, the actual insider attack image is disaggregated into: (1) a grayscale actual attack image from a first data in the actual insider attack image, (2) a first grayscale attack context image from a second data in the actual insider attack image, and (3) a second grayscale attack context image from a third data in the actual insider attack image. The first data, second data, and third data of the actual insider attack image are the respective channels discussed above. Thus, using the example above where the three channels are read, green, and blue, respectively, the actual grayscale actual attack image may be formed from the red components of the actual insider attack image; the first grayscale attack context image may be formed from the green components of the actual insider attack image; and the second grayscale attack context image may be formed from the blue components of the actual insider attack image.

Figure 6:
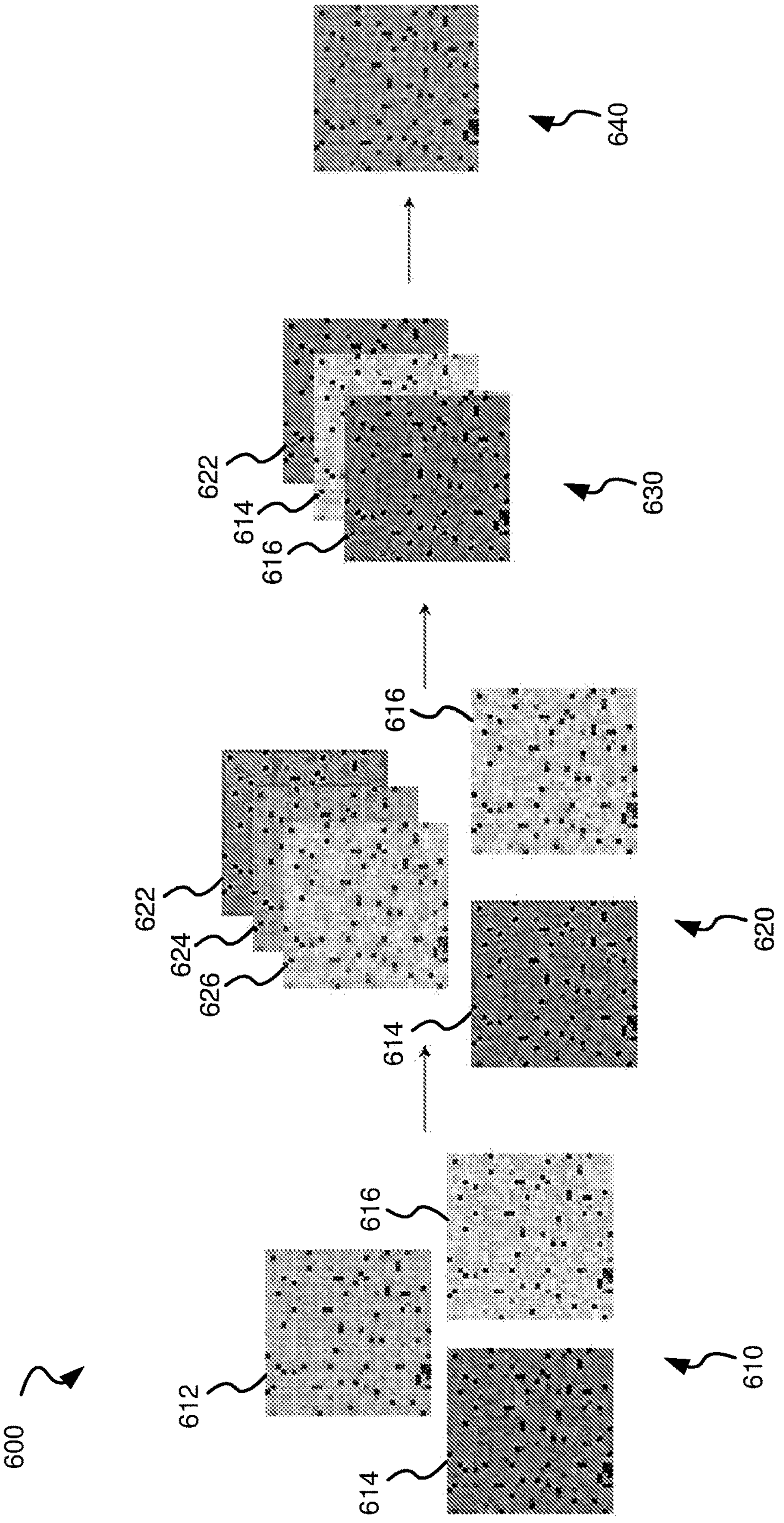
FIG. 6 graphically depicts the process of the flow diagram of FIG. 5.

Turning to FIG. 6, a process 600 is shown where an image set 610 including a color actual insider attack image 612 is accessed along with a first replacement context image 614 and a second replacement context image 616. An image set 620 shows a color actual insider attack image 612 that is disaggregated into: (1) a grayscale actual attack image 622 corresponding to one component color (e.g., red) of actual insider attack image 612, (2) a first grayscale attack context image 624 corresponding to another component color (e.g., green) of actual insider attack image 612; and (3) a second grayscale attack context image 626 corresponding to yet another component color (e.g., blue) of actual insider attack image 612.

Returning to FIG. 5, the first grayscale attack context image from the second data in the actual insider attack image is replaced by the first replacement context image, and the second grayscale attack context image from the third data in the actual insider attack image is replaced by the second replacement context image (block 510). This is done by assigning the first replacement context image as the second data, and assigning the second replacement context image as the third data.

Turning to FIG. 6, process 600 shows replacement of first grayscale attack context image 624 with first replacement context image 614, and replacement of second grayscale attack context image 626 with second replacement context image 616 to yield an image set 630.

Returning to FIG. 5, the replacement context images are combined with the grayscale actual attack image to yield a synthetic insider attack image (block 512). The color of the synthetic insider attack image will be different (unless the two replacement context images are identical to those they are replacing) from the actual insider attack image. This synthetic insider attack image is stored with other insider attack images (both actual and synthetic) (block 514). These combined insider attack images can be used to train an insider attack detection model.

Turning to FIG. 6, process 600 shows the combining of replacement context images 614, 616 with grayscale actual attack image 622 to yield a synthetic insider attack image 640. Again, as described in relation to FIG. 5, the color of synthetic insider attack image 640 will be different from the color of actual insider attack image 612 unless replacement context image 614 is identical to first grayscale attack context image 624 and replacement context image 616 is identical to first grayscale attack context image 626.

Returning to FIG. 5, it is determined whether more replacement context images remain to replace grayscale context images from the actual attack vector image (block 516). Any number of replacement context images can in theory be used, with each set of replacement context images resulting in generation of another synthetic insider attack image. However, at some number of replacement context images the resulting synthetic insider attack images start to be impacted significantly by overfitting. Where more replacement context images remain (block 516), the processes of blocks 506-416 are repeated for the next set of replacement context images.

Where no additional replacement context images remain (block 516), it is determined whether another actual insider attack image remains to be processed (block 518). Where another remains to be processed (block 516), the processes of blocks 504-418 are repeated for the next selected actual insider attack image.

Figure 7:
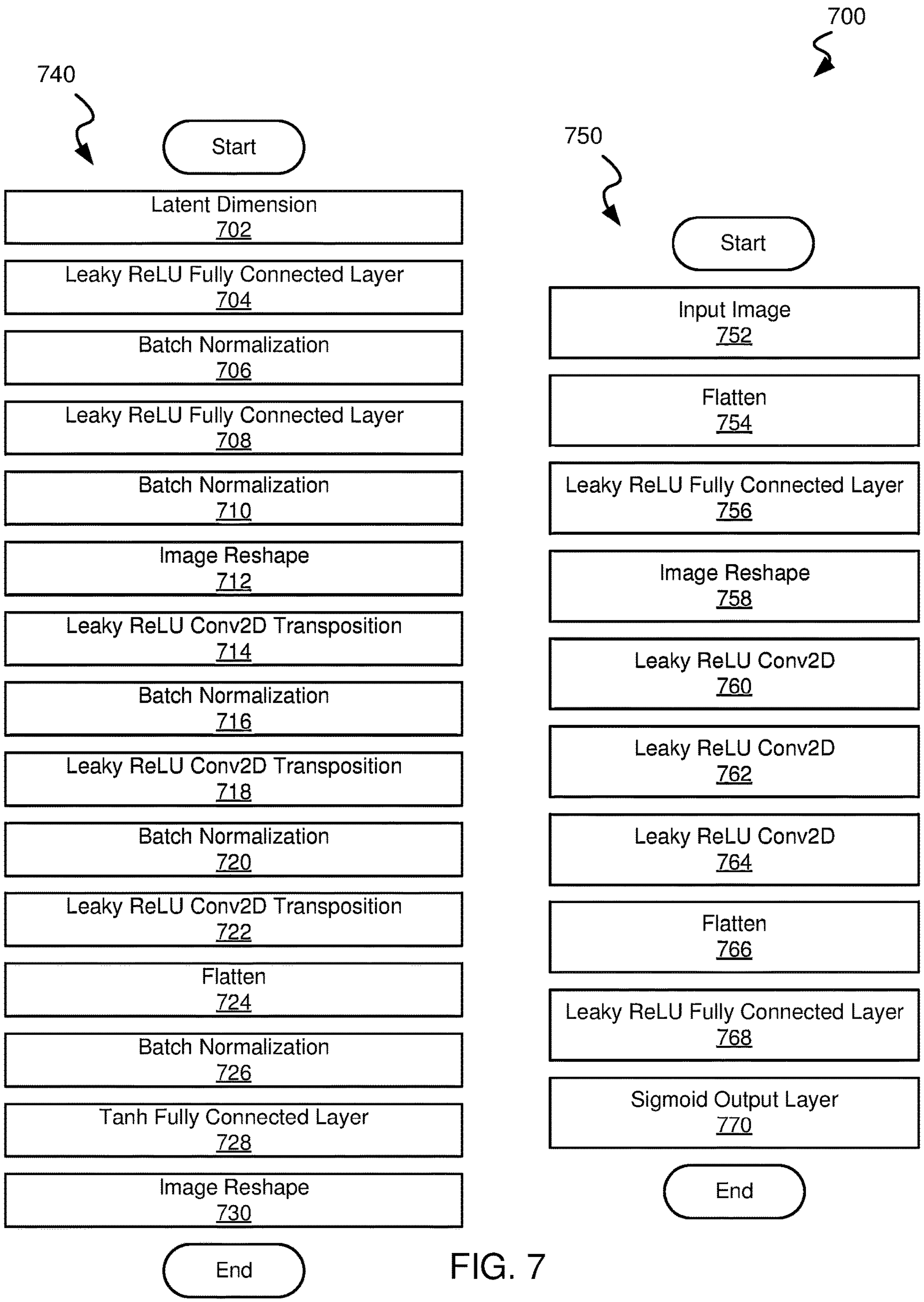
FIG. 7 shows a novel GAN architecture tailored for revealing insider attacks in accordance with various embodiments.

Turning to FIG. 7, a novel GANs architecture 700 tailored for revealing insider attacks is shown in accordance with various embodiments. As shown, novel GANs architecture 700 includes a generator 740 and a critic 750. Generator 740 is configured to generate an image for each vector it receives. Where known insider attacks are available, such vectors corresponding to the insider attacks are fed into generator 740 and each result in a respective image. In addition, generator 740 introduces noise to the received insider attack vectors by making small modifications to different vector values and generates images for each of these noise modified vectors. Such an approach results in a significant multiplication of images for the actual insider attack vectors and for surrounding noise modified vectors. Such an approach yields potentially thousands of slightly different images for each of the actual insider attack vectors.

Critic 750 is configured to accept a generated image from generator 740 and classifies the received image as a real image or a generated image. In effect, critic 750 seeks to determine whether an image received from generator 740 was created using a vector from an actual insider attack or a noise modified vector. Where the noise modification was to vector elements that are not indicative of an insider attack, critic 750 is able to classify the received image as not corresponding to an insider attack or a generated image. In contrast, where the noise modification was to vector elements that are indicative of an insider attack, critic 750 is less able to correctly classify the received image as a generated image. This classification information is fed back to generator 740.

In operation, generator 740 begins by adding noise to random elements in a known insider attack vectors to generate a large number of images. These images are provided to critic 750 that operates to classify the received images as either real images (i.e., generated from an actual insider attack) or generated images (i.e., generated from a noise modified vector). This classification information is fed back to generator 740. Where a noise modified vector is incorrectly classified by critic 750 as a real image, generator 740 learns that modification around the vector element modified in the particular noise modified vector confuses critic 750. In contrast, where a noise modified vector is correctly classified by critic 750 as a generated image, generator 740 learns that modification around the vector element modified in the particular noise modified vector does not confuse critic 750.

The desired result is for critic 750 to show an inability to properly classify or to return a correct classification half of the time and an incorrect classification half of the time. The greater the confusion of critic 750, the higher likelihood that generator 740 has identified elements within a network activity vector that are relevant to discerning and properly classifying network activity as an insider attack. Thus, over time as generator 740 learns which elements of a network activity vector when modified causes misclassification by critic 750, generator focuses more and more on the identified elements as it learns which elements of a network activity vector are relevant to identifying an insider attack. Once a threshold misclassification by critic 750 is achieved, the model is considered trained and may be deployed for identifying insider attacks in generic network activity ongoing in a network. In some embodiments, a model is considered trained when the misclassification is greater than forty percent (40%). In other embodiments, a model is considered trained when the misclassification is greater than forty-five percent (45%). In yet other embodiments, a model is considered trained when the misclassification is greater than forty-nine percent (49%). Based upon the disclosure provided herein, one of ordinary skill in the art will recognize a variety of thresholds that may be used in relation to different inventions to define a model as properly trained.

As shown, generator 740 includes a latent image dimension stage 702 where a size of the image is defined. In some embodiments, the image is defined as including one hundred, seventy (170) vector elements. Based upon the disclosure provided herein, one of ordinary skill art will recognize a variety of sizes that may be used in relation to different embodiments. The vector of the defined size is provided to a leaky rectified linear unit (leaky ReLU) fully connected layer stage 704. Next, normalization is performed in a batch normalization stage 706. A second leaky ReLU fully connected layer stage 708 is applied to the normalized output, and the result is again normalized in a batch normalization stage 710.

Figure 9A:
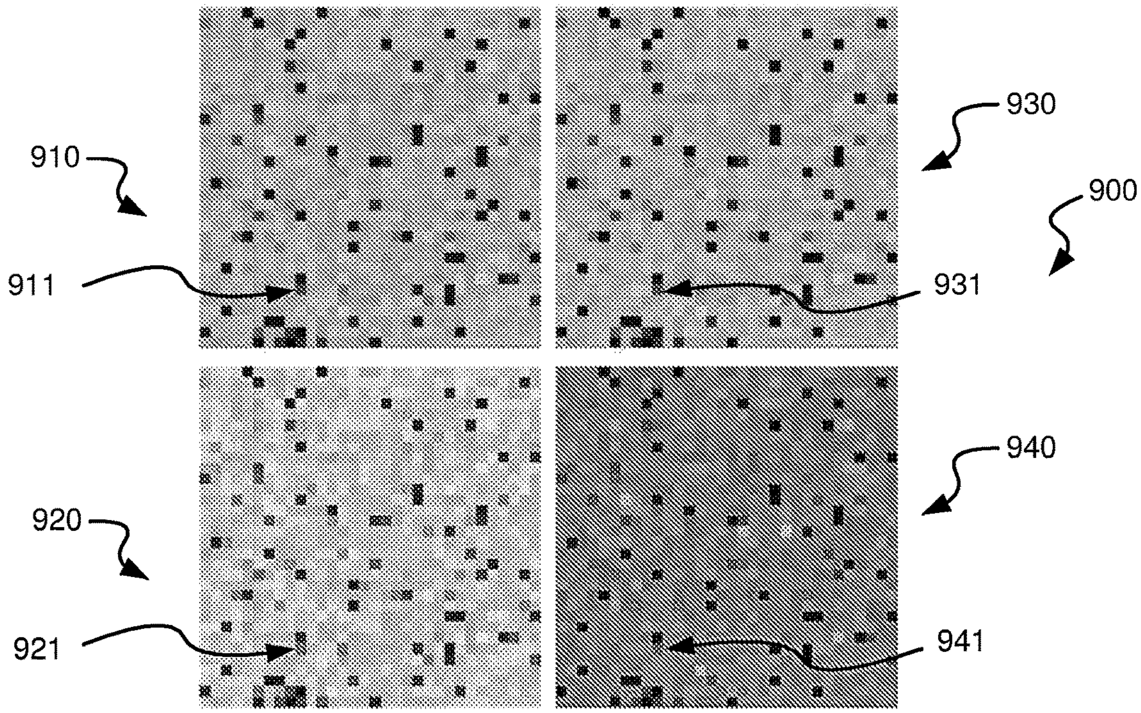
FIG. 9A are example images generated using dense-convolution-dense processing in accordance with various embodiments.

The combination of the leaky rectified linear unit (leaky ReLU) fully connected layer stages 704, 708 are used to generate specificity information. An example of specificity is shown in FIG. 9A where black dots 911, 921, 931, 941 represent particular data are maintained in the same location across multiple images 910, 920, 930, 940. This avoids the situation where the model becomes trained based upon the movement of particular data across images.

An image reshaping stage 712 is performed to render the image of a defined shape. In some embodiments, the image shapes is a 256 bit gray scale 4×4 image. A leaky ReLU two dimension convolution stage 714 is performed followed by normalization in a batch normalization stage 716. In some embodiments, leaky ReLU two dimension convolution stage 714 the parameter f of the convolution is sixty-four (64) and the parameter k of the convolution is five (5). Another leaky ReLU two dimension convolution stage 718 is performed followed by normalization in a batch normalization stage 720. In some embodiments, leaky ReLU two dimension convolution stage 718 the parameter f of the convolution is sixty-four (64) and the parameter k of the convolution is nine (9). Another leaky ReLU two dimension convolution stage 722 is performed followed by flattening in a flattening stage 724 and normalization in a batch normalization stage 726. In some embodiments, leaky ReLU two dimension convolution stage 722 the parameter f of the convolution is three (3) and the parameter k of the convolution is seventeen (17).

The three convolution stages 714, 718, 722 are used to generate spatial information. In embodiments discussed herein, the spatial information is color information. By applying the convolution stages 714, 718, 722 a generated image will have the same color across the image. An example of such spatial data uniformity is shown in FIG. 9A where image 910 is uniformly a first color, image 920 is uniformly a second color, image 930 is uniformly a third color, and image 940 is uniformly a fourth color. In contrast the example in FIG. 9B was generated without all of the convolution stages. An image 960 of FIG. 9B corresponds to image 910 of FIG. 9A; an image 970 of FIG. 9B corresponds to image 920 of FIG. 9A; an image 980 of FIG. 9B corresponds to image 930 of FIG. 9A; and an image 990 of FIG. 9B corresponds to image 940 of FIG. 9A. Again, image 910 has a uniform first color across the image. In contrast, image 960 has a non-uniform color with a diagonal center section 961 being of one color and the outer corner areas 962, 963 being another color.

Returning to FIG. 7, a Tanh fully connected layer stage 728 is applied followed by an image reshape stage 730. In some embodiments, Tanh fully connected layer stage 728 is done with a parameter of three thousand, seventy-two (3072), and the image is reshaped to a three color (i.e., RGB) 32×32 image.

Critic 750 receives an image generated by generator 740 in an image input stage 752. Critic 750 flattens the received input image in a flattening stage 754. Critic applies a leaky ReLU) fully connected layer stage 756 with a parameter of three thousand, seventy-two (3072) and performs an image reshape stage 758 where the image is reshaped into a three color (i.e., RGB) 32×32 image.

Critic applies three successive leaky ReLU two dimension convolution stages 760, 762, 764 are applied. For the leaky ReLU two dimension convolution stage 760, the parameter f of the convolution is sixty-four (64) and the parameter k of the convolution is seventeen (17). For the leaky ReLU two dimension convolution stage 762, the parameter f of the convolution is one-hundred, twenty-eight (128) and the parameter k of the convolution is nine (9). For the leaky ReLU two dimension convolution stage 764, the parameter f of the convolution is two-hundred, fifty-six (256) and the parameter k of the convolution is five (5). The result is flattened in a flattening stage 766.

Another leaky ReLU fully connected layer stage 768 is applied to the flattened result, and sigmoid output layer stage 770 is applied to the result. The output of sigmoid output layer stage 770 is a confidence value indicating whether the image processed corresponds to a real image or a generated image. This classification information is passed back to generator 740 where it is used to influence which elements of received vectors are relevant to identifying an insider threat.

Figure 8:
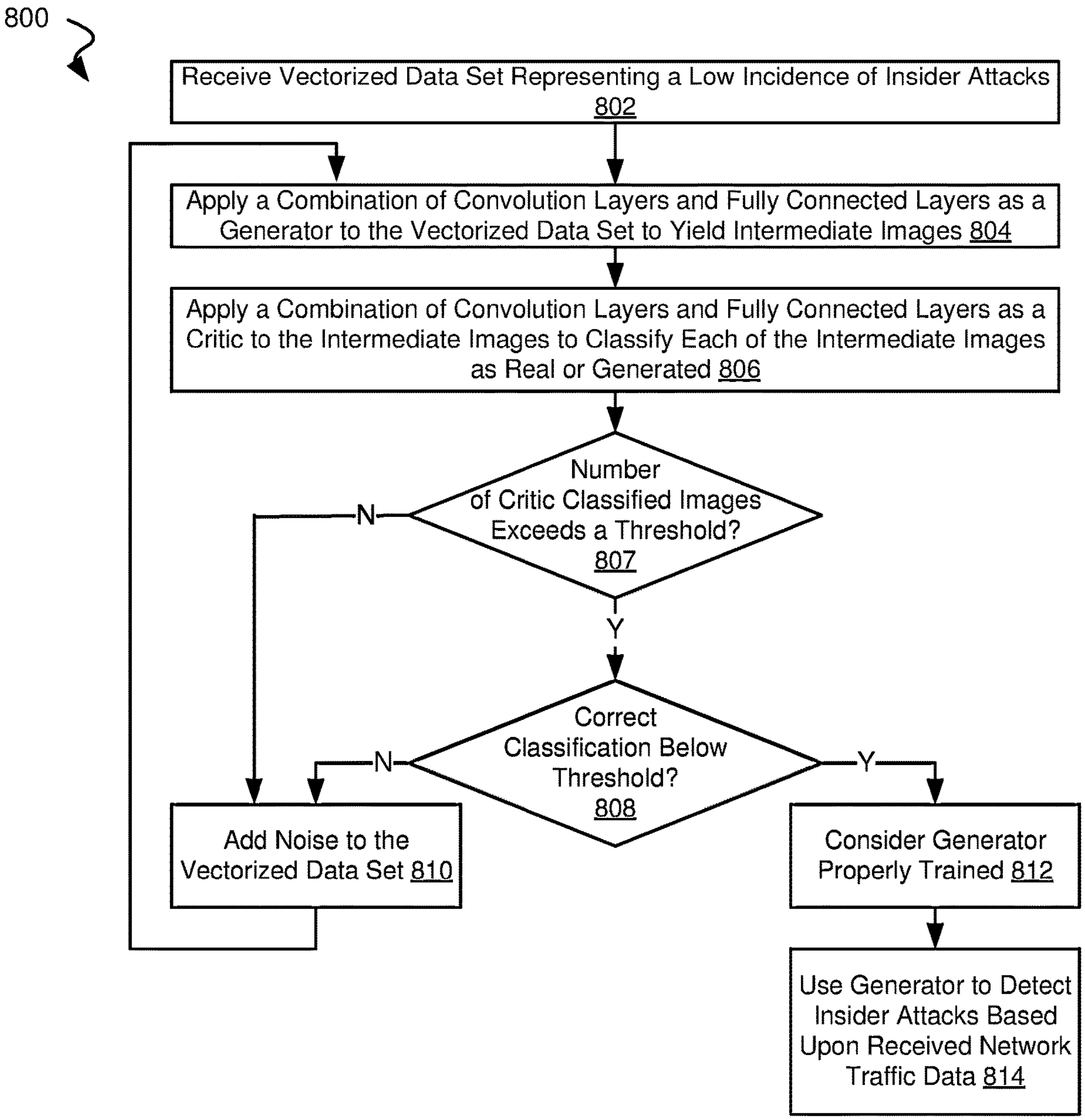
FIG. 8 is a flow diagram showing a method of processing synthetic insider attack images in accordance with some embodiments.
Figure 9B:
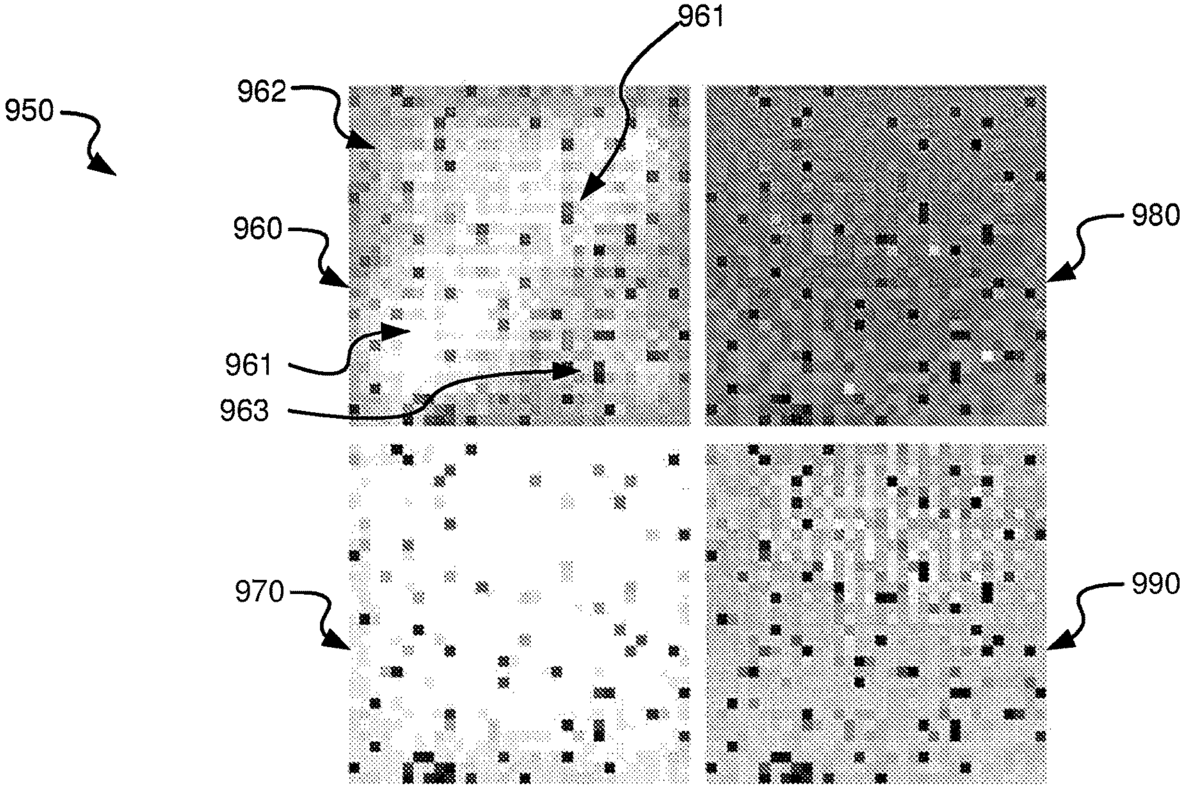
FIG. 9B are example images generated without the dense-convolution-dense processing of FIG. 9A.

Turning to FIG. 8, a flow diagram 800 shows a method of revealing insider attacks in accordance with some embodiments. Following flow diagram 800, a vectorized data set is received (block 802). The vectorized data set includes data from network traffic that were identified as insider attacks. As the number of insider attacks that occur is a very small percentage of network traffic, only a relatively small number of vectorized data sets are available for insider attacks. Various data or characteristics associated with the network traffic are assembled into a vector to yield a network activity vector, and multiple of the network activity vectors make up the vectorized data set. The data or characteristics of a network activity may include, but are not limited to, an indication of the source of the network activity, an indication of the target of the network activity, an indication of whether the source of the network activity is an insider, an indication of whether the source of the activity is an outsider, an indication of the action requested by the network activity, an indication of a time of the network activity, an indication of the use of a thumb drive or other mobile storage, and the like. Based upon the disclosure provided herein, one of ordinary skill in the art will recognize a large number of data or characteristics of a network activity that may be formed into a vectorized data set in accordance with different embodiments.

A variety of convolution layers and fully connected layers formed to operate as a generator are applied to the vectorized data set (block 804). In some embodiments, the generator is a novel GANs generator. In a particular embodiment, the GANs generator includes a latent image dimension stage where a size of the image is defined. In some embodiments, the image is defined as including one hundred, seventy (170) vector elements. A leaky ReLU fully connected layer stage is applied to the received vectors, and normalization is performed in a batch normalization stage. A second leaky ReLU fully connected layer stage is applied to the normalized output, and the result is again normalized in a batch normalization stage.

An image reshaping stage is performed to render the image of a defined shape. A leaky ReLU two dimension convolution stage is performed followed by normalization in a batch normalization stage. Another leaky ReLU two dimension convolution stage is performed followed by normalization in a batch normalization stage. Another leaky ReLU two dimension convolution stage is performed followed by flattening in a flattening stage and normalization in a batch normalization stage. A Tanh fully connected layer stage is applied followed by an image reshape stage. This yields an image corresponding to the received vector.

The images generated for each vector are provided to a critic that in turn applies a combination of convolution layers and fully connected layers in an attempt to classify the respective image as an image generated from actual insider attack data (i.e., a real image) or an image generated based upon a modified version of actual insider attack data (i.e., a generated image) (block 806). In some embodiments, the critic flattens the image received from the generator and applies a leaky ReLU fully connected layer stage with a parameter of three thousand, seventy-two (3072) and performs an image reshape stage where the image is reshaped into a three color (i.e., RGB) 82×32 image. The critic then applies three successive leaky ReLU two dimension convolution stages. Another leaky ReLU fully connected layer stage is applied to the flattened result, and sigmoid output layer stage is applied to the result. The output of sigmoid output layer stage is a confidence value indicating whether the image processed corresponds to a real image or a generated image.

After an initial number of images have been generated by the generator and classified by the critic (block 807), it is determined whether classification accuracy of the critic has gone below a defined threshold (block 808). Where the classification accuracy by the critic is not below the threshold (block 807), additional vectors are generated by adding noise to different elements of the actual insider attack data (block 810). Over time the generator begins to understand to which elements noise can be added and yet the critic will identify an image generated based upon the noise modified vector as having been generated based upon actual insider attack data, and which elements when noise modified result in correct identification as having been generated from noise modified data. Thus, each time the system loops more emphasis is made on generating noise modified vectors where the noise is introduced to the elements where it is more likely to fool the critic. The processes of blocks 804-306 are repeated until the accuracy of the critic classification goes below the defined threshold (block 808).

Once the accuracy of the critic classification goes below the defined threshold (block 808), the model is considered trained (block 812) and is deployed to detect insider attacks based upon received network traffic data (block 814).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for training an insider attack classification model, the system comprising:

a means for generating an image for each attack vector of a plurality of attack vectors to generate a plurality of real images, wherein each of the plurality of attack vectors includes a plurality of data elements from network traffic associated with an insider attack;

a means for creating a plurality of noise modified vectors by modifying at least one data element of the plurality of data elements of each of the plurality of attack vectors;

a means for generating an image for each noise modified vector of the plurality of noise modified vectors to yield a plurality of generated images;

a means for classifying each of real image of the plurality of real images and each generated image of the plurality of generated images as corresponding to either one of the plurality of attack vectors or one of the plurality of noise modified vectors;

a means for calculating an accuracy of the classifying; and a means for selectively identifying an insider attack model as trained based at least in part on the accuracy of the classifying.

2. The system of claim 1, wherein means for selectively identifying identifies the insider attack model as trained when the accuracy of the classifying is less than or equal to a threshold value.

3. The system of claim 2, wherein the threshold value is between forty-nine (49) percent accurate and fifty-one (51) percent accurate.

4. The system of claim 1, wherein the means for generating an image includes:

a first leaky rectified linear unit fully connected layer stage that generates a first output based on the attack vector; and a first leaky rectified linear unit two dimension convolution stage that generates a third output based on a second output derived from the first output.

5. The system of claim 4, wherein the means for generating an image further includes:

a second leaky rectified linear unit fully connected layer stage that outputs a fifth output based on a fourth output derived from the first output; and a second leaky rectified linear unit two dimension convolution stage that outputs a seventh output based on a sixth output derived from the third output; and a third leaky rectified linear unit two dimension convolution stage that outputs a ninth output based on an eight output derived from the seventh output.

6. The system of claim 4, wherein the first leaky rectified linear unit fully connected layer stage generates a fourth output based on the attack vector, and wherein the first leaky rectified linear unit two dimension convolution stage generates a sixth output based on a fifth output derived from the fourth output.

7. The system of claim 1, wherein the means for classifying includes:

a first leaky rectified linear unit fully connected layer stage that generates a first output based on a flattened version of the real image or the generated image; and a first leaky rectified linear unit two dimension convolution stage that generates a third output based on a second output derived from the first output.

8. The system of claim 7, wherein the means for classifying further includes:

a second leaky rectified linear unit two dimension convolution stage that generates a fifth output based on the third output;

a third leaky rectified linear unit two dimension convolution stage that outputs a sixth output based on the fifth output; and a second leaky rectified linear unit fully connected layer stage that outputs an eighth output based on a seventh output derived from the sixth output.

9. A method comprising:

a step for generating an image for each attack vector of a plurality of attack vectors to generate a plurality of real images, wherein each of the plurality of attack vectors includes a plurality of data elements from network traffic associated with an insider attack;

a step for creating a plurality of noise modified vectors by modifying at least one data element of the plurality of data elements of each of the plurality of attack vectors;

a step for generating an image for each noise modified vector of the plurality of noise modified vectors to yield a plurality of generated images;

a step for classifying each of real image of the plurality of real images and each generated image of the plurality of generated images as corresponding to either one of the plurality of attack vectors or one of the plurality of noise modified vectors;

a step for calculating an accuracy of the classifying; and a step for selectively identifying an insider attack model as trained based at least in part on the accuracy of the classifying.

10. The method of claim 9, wherein the step for selectively identifying identifies the insider attack model as trained when the accuracy of the classifying is less than or equal to a threshold value.

11. The method of claim 10, wherein the threshold value is between forty-nine (49) percent accurate and fifty-one (51) percent accurate.

12. The method of claim 9, wherein the step for generating an image includes:

generating a first output by applying a first leaky rectified linear unit fully connected layer stage to the attack vector; and generating a third output by applying a first leaky rectified linear unit two dimension convolution stage to a second output derived from the first output.

13. The method of claim 12, wherein the step for generating an image further includes:

generating a fifth output by applying a second leaky rectified linear unit fully connected layer stage to a fourth output derived from the first output; and generating a seventh output by applying a second leaky rectified linear unit two dimension convolution stage to a sixth output derived from the third output; and generating a ninth output by applying a third leaky rectified linear unit two dimension convolution stage to an eight output derived from the seventh output.

14. The method of claim 9, wherein the step for classifying includes:

generating a first output by applying a first leaky rectified linear unit fully connected layer stage to a flattened version of the real image or the generated image; and generating a third output by applying a first leaky rectified linear unit two dimension convolution stage that to a second output derived from the first output.

15. The method of claim 14, wherein the step for classifying further includes:

generating a fifth output by applying a second leaky rectified linear unit two dimension convolution stage to the third output;

generating a sixth output by applying a third leaky rectified linear unit two dimension convolution stage to the fifth output; and generating an eighth output by applying a second leaky rectified linear unit fully connected layer stage to a seventh output derived from the sixth output.

16. A non-transitory computer-readable storage medium embodying a set of instructions, which when executed by a processing resource, causes the processing resource to perform a method including:

a step for generating an image for each attack vector of a plurality of attack vectors to generate a plurality of real images, wherein each of the plurality of attack vectors includes a plurality of data elements from network traffic associated with an insider attack;

a step for creating a plurality of noise modified vectors by modifying at least one data element of the plurality of data elements of each of the plurality of attack vectors;

a step for generating an image for each noise modified vector of the plurality of noise modified vectors to yield a plurality of generated images;

a step for classifying each of real image of the plurality of real images and each generated image of the plurality of generated images as corresponding to either one of the plurality of attack vectors or one of the plurality of noise modified vectors;

a step for calculating an accuracy of the classifying; and a step for selectively identifying an insider attack model as trained based at least in part on the accuracy of the classifying.

17. The non-transitory computer-readable storage medium of claim 16, wherein the step for selectively identifying identifies the insider attack model as trained when the accuracy of the classifying is less than or equal to a threshold value.

18. The non-transitory computer-readable storage medium of claim 17, wherein the threshold value is between forty-nine (49) percent accurate and fifty-one (51) percent accurate.

19. The non-transitory computer-readable storage medium of claim 16, wherein the step for generating an image includes:

generating a first output by applying a first leaky rectified linear unit fully connected layer stage to the attack vector; and generating a third output by applying a first leaky rectified linear unit two dimension convolution stage to a second output derived from the first output.

20. The non-transitory computer-readable storage medium of claim 19, wherein the step for generating an image further includes:

generating a fifth output by applying a second leaky rectified linear unit fully connected layer stage to a fourth output derived from the first output; and generating a seventh output by applying a second leaky rectified linear unit two dimension convolution stage to a sixth output derived from the third output; and generating a ninth output by applying a third leaky rectified linear unit two dimension convolution stage to an eight output derived from the seventh output.

* * * * *